United States Patent

Yokouchi et al.

[11] Patent Number: 5,973,339
[45] Date of Patent: Oct. 26, 1999

[54] SEMICONDUCTOR PHOTODETECTOR HAVING AN OPTICAL ATTENUATOR

[75] Inventors: Noriyuki Yokouchi; Takeharu Yamaguchi; Junji Yoshida, all of Kanagawa, Japan

[73] Assignee: The Furukawa Electric Co. Ltd., Tokyo, Japan

[21] Appl. No.: 08/968,163

[22] Filed: Nov. 12, 1997

[30] Foreign Application Priority Data

Nov. 15, 1996 [JP] Japan ................................. 8-304487

[51] Int. Cl.⁶ ..................... H01L 29/205; H01L 31/0304; G02F 1/015
[52] U.S. Cl. .................... 257/184; 257/431; 257/436; 257/458; 257/464; 250/370.14; 359/248
[58] Field of Search ..................... 257/184, 436, 257/431, 458, 464; 250/370.14; 359/248

[56] References Cited

U.S. PATENT DOCUMENTS

| | | | |
|---|---|---|---|
| 5,311,221 | 5/1994 | Voddani | 257/431 |
| 5,321,275 | 6/1994 | Shimizu | 257/184 |
| 5,528,413 | 6/1996 | Ishimura | 359/248 |

Primary Examiner—Jerome Jackson, Jr.
Attorney, Agent, or Firm—Helfgott & Karas, P.C.

[57] ABSTRACT

A waveguide type semiconductor photodetector device comprises a photosensitive section including a photo-absorption layer for converting a signal light into an electric signal, and an optical attenuation section including an optical attenuation layer made of a bulk crystal for attenuating incident light. Assuming that $E_{g,ATT}$ and $E_{in}$ are bandgap energy of the optical attenuation layer and optical energy of the incident light signal, respectively, $E_{in}+50$ meV $\leq E_{g,ATT} \leq E_{in}+100$ meV holds. The optical absorption layer and the optical attenuation layer are made of GaInAs and GaInAsP, respectively, for adapting to incident light of a 1.55 mm wavelength.

6 Claims, 3 Drawing Sheets

SEMICONDUCTOR PHOTODETECTOR HAVING AN OPTICAL ATTENUATOR

BACKGROUND OF THE INVENTION

(a). Field of the Invention

The present invention relates to a waveguide type semiconductor photodetector and, more particularly, to a semiconductor photodetector comprising a waveguide having a function of power attenuation of incident light to a suitable level based on the amplitude thereof to obtain excellent output characteristics against signal distortion in a wide frequency range. Such a photodetector device is suitable for a communication system using a AM-FDM (amplitude modulation/frequency division modulation) technique.

(b). Description of the Related Art

A waveguide type photodetector device is desired in the subscriber optical modules in an optical communication system, which has a function for limiting the maximum amplitude of the output photo-current at a predetermined level irrespective the amplitude of the incident light received in the photodetector device. The applicant has proposed, in Patent application Ser. No. 7-243725 (published on Mar. 7, 1997 as Patent Publication No. JP-A-9(1997)-64399), a waveguide type semiconductor photodetector device having a variable photo-sensitivity. In the proposed device, a multiple quantum well (hereinafter called MQW) structure constituting an optical attenuation section is disposed at the input of the photosensitive element to utilize a quantum confined stark effect (hereinafter called QCSE), which is generated upon applying a source voltage thereto.

In general, it is known that an optical absorption spectrum in the MQW structure as well as the signal change therein upon application of a source voltage varies depending on the polarization of the incident light. Therefore, the amount of optical attenuation in the MQW structure varies depending on the polarization of the incident light also in the proposed variable-sensitivity photodetector device, thereby exhibiting a polarization dependency of the photosensitivity as a photodetector device. Accordingly, it is difficult to limit the output level of the photosensitive element in the proposed device since the polarization of a signal light received by an optical receiver generally varies at random in an optical communication system.

SUMMARY OF THE INVENTION

It is therefore an object of the present invention to provide a waveguide type photodetector device which is capable of limiting the maximum output current from a photosensitive element substantially at a predetermined level irrespective of the power level of the incident light, even when the photodetector device is used in an optical communication system wherein the polarization of the incident light varies at random.

The present inventors noted that the optical attenuation section should be improved in order to remove the polarization dependency of the output photo-current of the photodetector device, and achieved the present invention by employing a bulk crystal for the optical waveguide layer acting as an optical attenuator for the incident light.

In accordance with the present invention, a photodetector device comprises: a photosensitive section including a photo-absorption layer for converting a first signal light into an electric signal, and a first electrode pair for deriving the electric signal; and an optical attenuation section including an optical attenuation layer made of a bulk crystal and optically coupled with the photo-absorption layer, the optical attenuation layer receiving an incident signal light to transfer an attenuated signal light to the photo-absorption layer as the first signal light, and a second electrode pair for applying a voltage to the optical attenuation layer to control the first signal light.

By employing the bulk crystal for the optical waveguide layer having an optical attenuation function in the present invention, a variable-sensitivity output signal can be obtained from the photosensitive element substantially independently of the polarization of the incident light. The term "bulk crystal" as used herein means a relatively thick semiconductor crystal wherein no quantum effect appears therein. The bulk crystal can be formed by an epitaxial growth technique. The quantum effect is not observed, in general, in a semiconductor layer having a thickness larger than about 30 nm, and accordingly, a semiconductor layer having such a thickness can be called a bulk crystal.

In the semiconductor photodetector of the present invention, it is preferable that the relationship between the bandgap energy ($-E_{g,ATT}$) of the optical waveguide layer having an optical attenuation function and the optical energy $E_{in}$ of the incident light which depends on the wavelength be such that:

$$E_{in}+50 \text{ meV} \leq E_{g,ATT} \leq E_{in}+100 \text{ meV}.$$

In this case, a lower energy loss can be obtained in a non-bias state of the waveguide layer, and a sufficient variable photosensitivity can be obtained in the optical attenuation section at a low applied voltage.

The above and other objects, features and advantages of the present invention will be more apparent from the following description, referring to the accompanying drawings.

PREFERRED EMBODIMENTS OF THE INVENTION

Now, the present invention is more specifically described with reference to the accompanying drawings.

Figure 1:
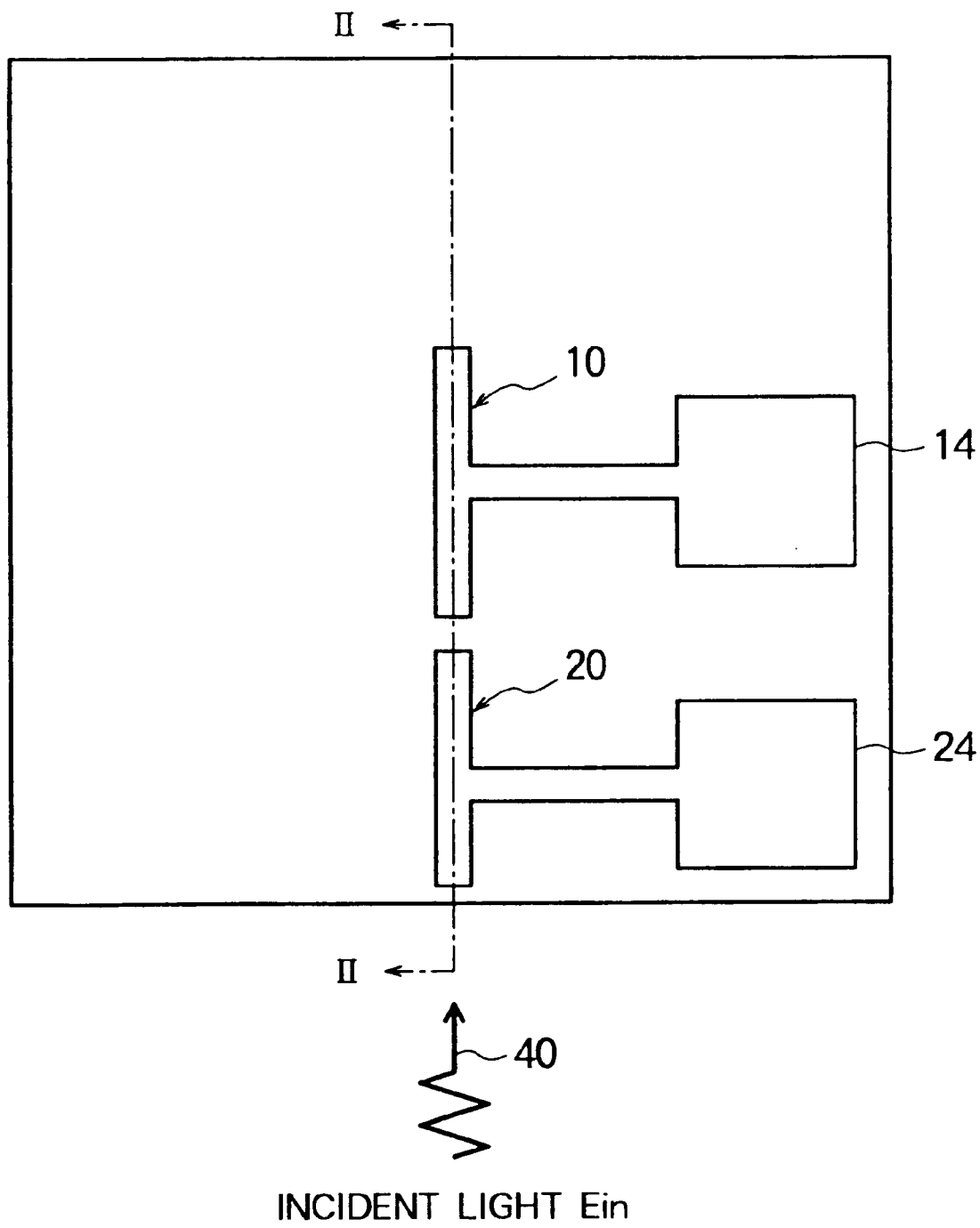
FIG. 1 is a top plan view of a semiconductor photodetector device according to an embodiment of the present invention.

Referring first to FIG. 1, a photodetector device according to an embodiment of the present invention comprises a photosensitive section 10 having a photosensitive element and a first p-side electrode 14 for supplying a source voltage to the photosensitive element, and an optical attenuation section 20 having an optical waveguide aligned to the photosensitive element for receiving incident light 40 and a second p-side electrode 24 for supplying a source voltage to the optical waveguide. The incident light is attenuated in the optical attenuation section 20 to be supplied to the photosensitive section 10 as the input thereof.

Figure 2:
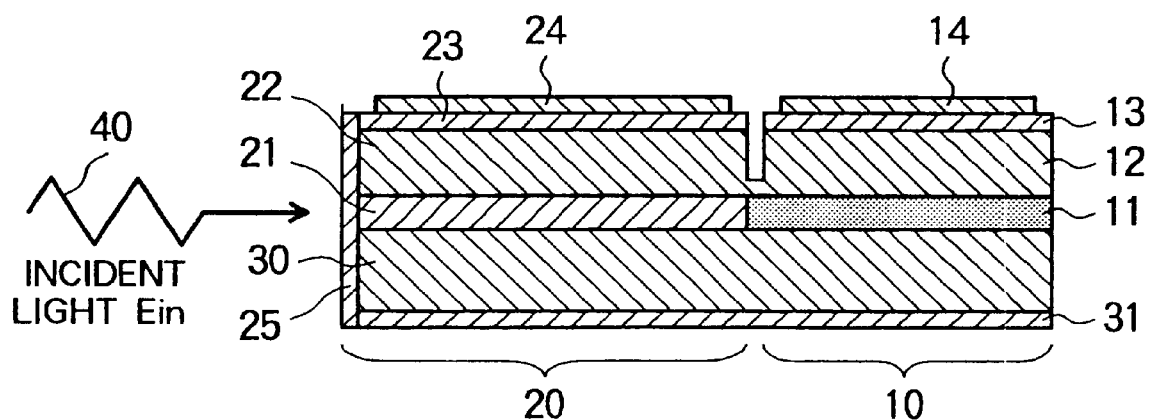
FIG. 2 is a cross-sectional view of the semiconductor photodetector device of FIG. 1, taken along line II—II in FIG. 1.

Referring to FIG. 2, the photosensitive section 10 and the optical attenuation section 20 are formed on a common InP substrate 30. The first and second p-side electrodes 14 and 24 are separately formed for the respective sections 10 and 20 on the top of the sections 10 and 20, whereas a common n-side electrode 31 is provided at the bottom surface of the substrate 30 for both the sections 10 and 20.

The photosensitive section 10 comprises an optical absorption layer 11 acting as a photosensitive element, an InP cladding layer 12, a GaInAs contact layer 13, and the first p-side electrode 14, which are consecutively grown on the common InP substrate 30 to form a stripe ridge extending in the travelling direction of the incident light, as shown in FIG. 1.

The optical attenuation section 20 comprises an optical waveguide layer 21 acting as an optical attenuation element, an InP cladding layer 22, a GaInAs contact layer 23, and the second p-side electrode layer 24, which are consecutively grown on the common InP substrate 30 to form another ridge stripe extending in the travelling direction of the incident light 40, as shown in FIG. 1. In these configurations, each of the photosensitive section 10 and the optical attenuation section 20 forms a light confinement structure for confining the incident light in the vertical and horizontal directions. The receiving facet of the optical attenuation section 20 is coated with an anti-reflection coat layer 25.

The optical waveguide layer 21 acting as the optical attenuation element is made of a bulk GaInAsP crystal having an bandgap energy $E_{g,ATT}$ of 0.855 eV (855 meV) and a film thickness of 0.2 $\mu$m. The optical absorption layer 11 is made of a bulk GaInAs crystal having a bandgap energy of 0.74 meV, and a film thickness of 0.2 $\mu$m.

The photodetector device of the present embodiment is designed to operate at a wavelength of 1.55 $\mu$m in an optical communication system, and the relationship between the bandgap energy $E_{g,ATT}$ of the optical attenuation layer 21 and the optical energy $E_{in}$ of the incident light is designed such that:

$$E_{g,ATT}=E_{in}+55 \text{ meV}.$$

The optical attenuation section 20 and the photosensitive section 10 are obtained by growing a common layer structure including a top common p-side layer, common contact layer and a common cladding layer and a subsequent selective etching of the common p-side layer, common contact layer and a portion of the common cladding layer to form a separation groove for electrically separating both the sections 10 and 20 from each other, thereby obtaining the structure of FIG. 2.

By employing the configurations as described above, both the sections 10 and 20 can be applied with different source voltages independently of each other, whereas a signal light is transmitted through the optical attenuation section 20 to the photosensitive section 10 after attenuation of the optical power to a suitable level. The separation groove may be filled with a transparent dielectric material.

The absorption coefficient for the signal light in the optical attenuation section 20 can be controlled by the voltage applied to the waveguide layer independently of the voltage applied to the photosensitive layer in the photosensitive section 10 so as to change the equivalent bandgap energy of the waveguide layer 21. In this scheme, the optical power of the signal light to be supplied to the photosensitive section 10 is controlled to a suitable level, which in turn limits the output current from the photosensitive section.

Figure 3:
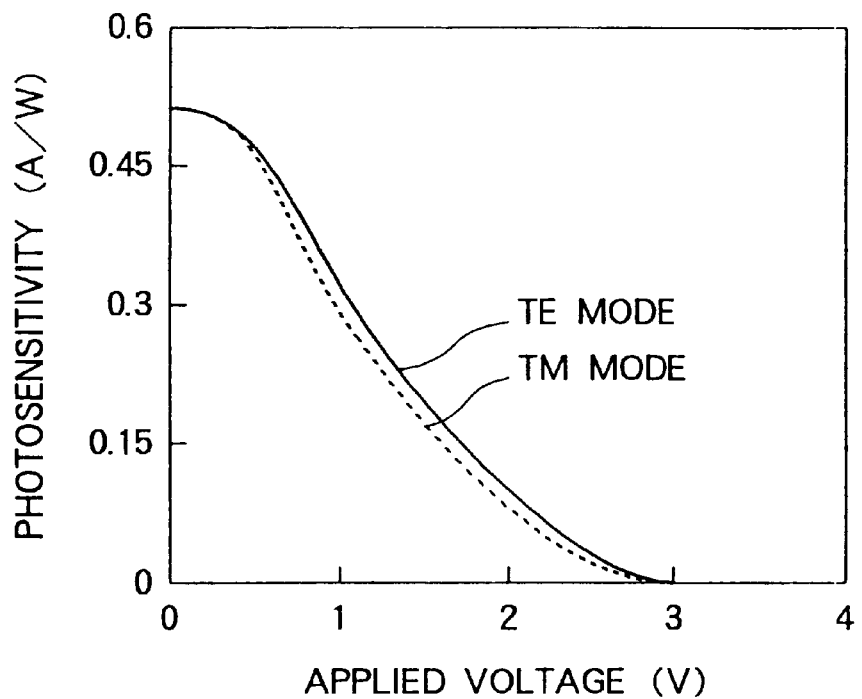
FIG. 3 is a graph showing the relationship between the voltage applied to the optical attenuation section and the photosensitivity of the photosensitive element in the semiconductor photodetector device of FIG. 1.

FIG. 3 shows the relationship obtained by measurements for the photodetector device of the present embodiment in the case of a signal light having a wavelength of 1.55 $\mu$m, wherein the photosensitivity of the photodetector device is plotted against the voltage applied to the optical attenuation section 20. The solid line shows the photosensitivity for the TE (transverse electric) polarized wave, whereas the dotted line shows the photosensitivity for the TM (transverse magnetic) polarized wave.

As shown in the graph, when the applied voltage is varied from 0 volt to 3 volts while receiving the signal light of each polarized wave, the resultant photosensitivity varies from 0.5 amperes/watt to zero ampere/watt, wherein polarization dependency was very small. That is, the photodetector device of the present embodiment exhibited an excellent photosensitivity with a negligible polarization dependency because of the bulk crystal layer used in the optical attenuation section. A plurality of actual examples of the photodetector device according to the present embodiment were manufactured, which had optical attenuation sections having bandgap energies $E_{g,ATT}$ different from one another. The bandgap energies $E_{g,ATT}$ as employed herein were 800, 850, 900, 950 and 1000 meV, i.e., in stepwise increase by 50 meV from 800 to 1000 meV. A signal light of a 1.55 $\mu$m wavelength was introduced to respective samples to measure the photosensitivity thereof. The 1.55 $\mu$m wavelength of the incident light corresponds to an optical energy $E_{in}$ of 800 meV. The results were shown in FIG. 4, wherein the photosensitivity (ampere/watt) is plotted against the difference ($E_{g,ATT}-E_{in}$) between the bandgap energy $E_{g,ATT}$ of the attenuation layer and the energy $E_{in}$ of the incident light.

Figure 4:
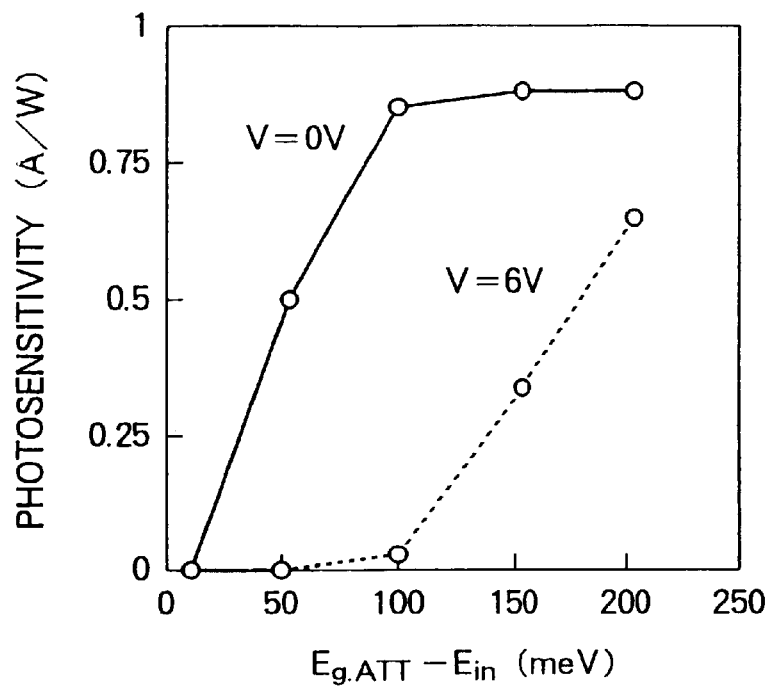
FIG. 4 is a graph showing the relationship between the bandgap energy of the optical attenuation section and the photosensitivity of the photosensitive section in the semiconductor photodetector of FIG. 1, obtained in the case of 1.55 µm wavelength of the incident light.

In FIG. 4, the solid line shows the case of a voltage of zero (or non-bias state) applied to the optical attenuation section, whereas the dotted line shows the case of an applied voltage of 6 volts. As understood from the same drawing, if the difference ($E_{g,ATT}-E_{in}$) is less than 50 meV (or $E_{g,ATT}-E_{in}<50$ meV), the power loss by optical absorption in the optical attenuation section 10 is considerably large even in the non-bias state, whereby a sufficient photosensitivity is not obtained as a photodetector device.

Figure 5:
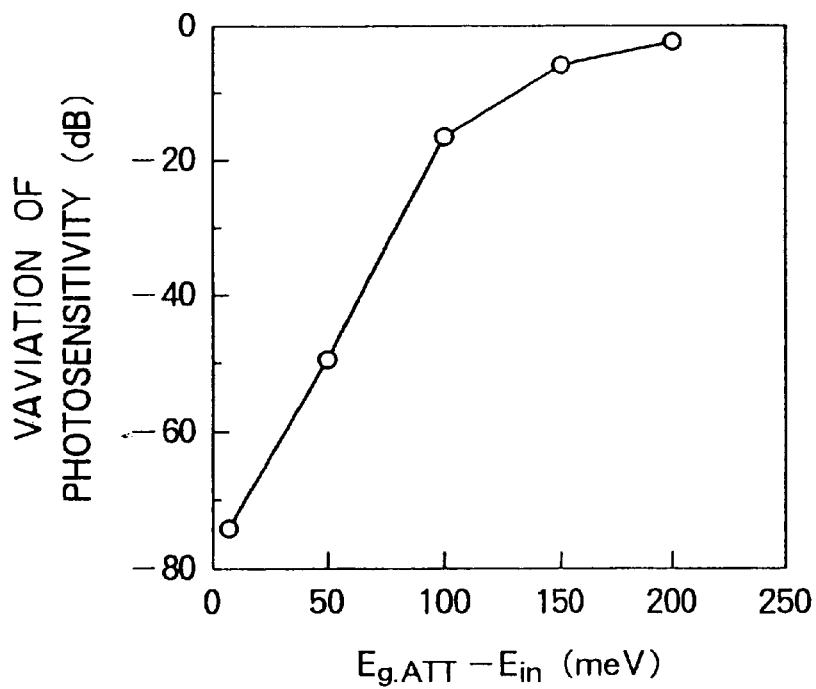
FIG. 5 is a graph obtained from FIG. 4 by indicating variation of the photosensitivity in FIG. 4 in terms of decibel, showing reduction of the photosensitivity against the applied voltage being varied from 0 to 6 volts.

FIG. 5 shows the decibel (dB) representation of variation of the photosensitivity shown in FIG. 4. As understood from FIG. 5, if the difference ($E_{g,ATT}-E_{in}$) exceeds 100 meV (or $E_{g,ATT}-E_{in}>100$ meV), the increase of the absorption coefficient of the optical attenuation section accompanied by the increase of the applied voltage is insufficient, which limits the variable range of the photosensitivity to be below 10 dB.

It is understood from FIGS. 4 and 5, the difference ($E_{g,ATT}-E_{in}$) should be between 50 meV and 100 meV (or 50 meV $\leq E_{g,ATT}-E_{in} \leq 100$ meV), in order to attain a sufficient photosensitivity which follows the applied voltage substantially without reduction of the photosensitivity in the optical attenuation section at the non-bias state thereof. That is, if the optical attenuation section is formed by a bulk crystal having such a property, excellent characteristics can be obtained in the optical attenuation section.

The present embodiment is exemplarily described heretofore with reference to the case of a GaInAsP optical attenuation layer and a GaInAs photosensitive layer. The optical attenuation layer and the photosensitive layer, however, may be made of AlGaInAs instead, for example.

In addition, a photodetector device operating at a wavelength of 1.3 $\mu$m may be employed instead of the wavelength of 1.55 μm. Further, a plurality of light confinement layers may be formed above or below the optical absorption layer, although a waveguide of a three-layer structure having InP/GaInAs (P)/InP layers is shown in the above embodiment. The thickness of the waveguide layer or optical absorption layer is not limited to 0.2 μm either and may be about 30 nm or above, wherein a quantum effect does not appear.

Since the above embodiments are described only for examples, the present invention is not limited to the above embodiments and various modifications or alterations can be easily made therefrom by those skilled in the art without departing from the scope of the present invention.

What is claimed is:

1. A photodetector device comprising:
    a photosensitive section including a photo-absorption layer for converting a first signal light into an electric signal, and a first electrode pair for deriving said electric signal; and
    an optical attenuation section including an optical attenuation layer made of a bulk crystal and optically coupled with said photo-absorption layer, said optical attenuation layer receiving an incident signal light to transfer an attenuated signal light to said photo-absorption layer as said first signal light, and a second electrode pair for applying a voltage to said optical attenuation layer to control said first signal light.

2. The photodetector device as defined in claim 1, wherein an equation of $E_{in}+50$ meV $\leq E_{g\text{-}ATT} \leq E_{in}+100$ meV holds wherein $E_{g\text{-}ATT}$ and $E_{in}$ are bandgap energy of said optical attenuation layer and optical energy of said incident light signal, respectively.

3. The photodetector device as defined in claim 1, wherein said optical absorption layer and said optical attenuation layer are made of GaInAs and GaInAsP.

4. The photodetector device as defined in claim 3, wherein said incident light has a wavelength of 1.55 μm.

5. The photodetector device as defined in claim 1, wherein said photo-absorption layer is made of a bulk crystal.

6. The photodetector devices as defined in claim 2 wherein the film thickness of the optical attenuation layer is 2 μm and the film thickness of the optical absorption layer is 2 μm.

* * * * *